United States Patent [19]
Subramanian

[11] Patent Number: 5,853,688
[45] Date of Patent: *Dec. 29, 1998

[54] CRYSTALLINE LEAD-CONTAINING OXFLUORIDES

[75] Inventor: Munirpallam Appadorai Subramanian, Kennett Square, Pa.

[73] Assignee: E. I. du Pont de Nemours and Company, Wilmington, Del.

[21] Appl. No.: 893,435

[22] Filed: Jul. 11, 1997

Related U.S. Application Data

[60] Provisional application No. 60/023,934 Aug. 9, 1996.
[51] Int. Cl.$^6$ .................................................. C01B 9/08
[52] U.S. Cl. ........................... 423/464; 361/311; 423/263
[58] Field of Search ................... 423/464, 263; 361/311

[56] References Cited

U.S. PATENT DOCUMENTS

| | | | |
|---|---|---|---|
| 3,365,269 | 1/1968 | Chamberland | 423/464 |
| 3,440,004 | 4/1969 | Muhler | 423/464 |
| 3,532,641 | 10/1970 | Chamberland | 423/464 |
| 4,110,251 | 8/1978 | Lauder et al. | 423/464 |
| 5,312,612 | 5/1994 | Srivastava et al. | 423/464 |

FOREIGN PATENT DOCUMENTS

| | | |
|---|---|---|
| 2 248 587 | 5/1975 | France . |
| 2 555 161 | 5/1985 | France . |

OTHER PUBLICATIONS

I.O.Troyanchuk et al., High–Pressure Synthesis Of Some Perovskite–Like Compounds With A Mixed Anion Type, *Materials Research Bulletin*, 30, No. 4, 421–425, 1995 (No month).

*Primary Examiner*—Ngoc-Yen Nguyen
*Attorney, Agent, or Firm*—Joseph A. Tessari

[57] ABSTRACT

A crystalline lead-containing oxyfluoride of the formula $PbMO_2F$ wherein M is selected from the group consisting of Ga, Sc, In, Lu, Yb, Tm, Er and Tl.

5 Claims, No Drawings

CRYSTALLINE LEAD-CONTAINING OXFLUORIDES

This is a complete application based on US Provisional application Ser. No. 60/023,934 filed on Aug. 9, 1996.

BACKGROUND OF THE INVENTION

This invention relates to a group of new crystalline lead-containing oxyfluorides having useful dielectric properties.

The use of dielectric materials to increase capacitance is well-known and long-used. Earlier capacitor dielectrics fell into two categories. The first category of dielectrics has a relatively temperature-independent, but low, e.g., 5–10, dielectric constant. Materials such as electrical porcelain and mica fall in this category. The second category of dielectrics has a very high, e.g., $\geq 1000$, but temperature-dependent dielectric constant. An example is barium titanate.

Capacitance is proportional to the dielectric constant. Accordingly, materials with a high dielectric constant are desired. In order to perform acceptably in tuning or resonance circuits, the dielectric must have a dielectric constant that exhibits minimal temperature dependence; otherwise small changes in ambient temperature throw the circuit out of resonance. Other applications require a dielectric constant that exhibits minimal frequency dependence. It is also desirable to have the loss or dissipation factor be as small as possible. The need exists for materials with all of the above properties.

Troyanchuk et al., Mater. Res. Bull. 30, 421 (1995) disclose the compositions $PbFeO_2F$ and $BaFeO_2F$. They report that $PbFeO_2F$ is antiferromagnetic and has a dielectric constant of about 20 at 1 MHz and that the dielectric constant is practically the same in the temperature range of 77–293K. They also report trying to synthesize other $ABO_2F$ compounds where A=Ba, Pb, Ca and B=In, Cr, Al. However, they could not obtain any of these, in spite of a wide variation of synthesis conditions. They hypothesize that the stability range of $ABO_2F$ compounds is narrow and probably connected with the use of $Fe^{3+}$ ions.

SUMMARY OF THE INVENTION

This invention provides novel crystalline lead-containing oxyfluorides of the formula $PbMO_2F$ wherein M is Ga, Sc, In, Lu, Yb, Tm, Er or Tl. These oxyfluorides are useful in dielectric applications.

DETAILED DESCRIPTION OF THE INVENTION

The dielectric constants of the oxyfluorides of the formula $PbMO_2F$, wherein M is Ga, Sc, In, Lu, Yb, Tm, Er, or Tl, are greater than 15 and are essentially independent of temperature and frequency. The dissipation factors are low. These oxyfluorides are useful in applications requiring dielectrics with such properties, e.g., to increase the capacitance of a capacitor.

These $PbMO_2F$ compositions of this invention can be synthesized by first thoroughly mixing stoichiometric amounts of the precursors. Precursors such as PbO, $PbF_2$, $M_2O_3$ and $MF_3$, wherein M is Ga, Sc, In, Lu, Yb, Tm, Er or Tl, are preferred. Especially preferred is the use of stoichiometric amounts of PbO, $PbF_2$ and $M_2O_3$. The intimately mixed starting material is loaded in a gold capsule and sealed. When M=Ga, Sc, In, Lu, Yb, Tm or Er, the capsule is placed in a tetrahedral anvil apparatus and subjected to a pressure of $50 \times 10^8$ Pa–$70 \times 10^8$ Pa (50–70 kbar) and heated to 700° C. to 900° C. The temperature and pressure are maintained for 45 minutes to 75 minutes. In the case of M=Tl, the capsule should be heated to about 550° C. and the pressure and temperature maintained for 30 minutes. The capsules are rapidly cooled, i.e., quenched, to room temperature and then the pressure is released. The capsule is removed and cut open and the dense pellet is recovered.

The lead-containing oxyfluorides of this invention possess a perovskite-type crystal structure and X-ray diffraction results can be indexed on the basis of a simple cubic cell.

Dielectric measurements reported in the Examples were carried out on a disk shaped sample, approximately 3 mm in diameter and approximately 1 mm thick, cut from the dense pellet of $PbMO_2F$ produced in each Example. The faces of the disk-shaped samples were polished with a fine-grit sand or emery paper. Silver paint electrodes were applied on the faces and dried at 200° C. The capacitance and the dielectric loss measurements were performed by the two-terminal method using a Hewlett-Packard 4285A LCR bridge in the frequency range $10^4$ to $10^7$ Hz and the capacitance, C, and the dissipation factor, DF, are read directly from the bridge. The dielectric constant (K) was calculated from the measured capacitance, C in picofarads, from the relationship, K=(100 C t)/(8.854 A), where t is thickness of the disk shaped sample in cm and A is the area of the electrode in $cm^2$.

EXAMPLES

Oxyfluorides of the formula $PbMO_2F$, wherein M=Ga, Sc, In, Lu, Yb, Tm, Er and Tl were prepared by the following procedure:

The precursors oxides and fluorides and amounts thereof (in stoichiometric ratios of $PbO:PbF_2:2M_2O_3$) as shown in Table I were mixed thoroughly and about 400 mg of the mixture was placed in a gold capsule (3 mm diameter and 6 mm length) and sealed. The capsule was placed in a tetrahedral anvil apparatus and was subjected to $58 \times 10^8$ Pa (58 kbar) pressure and heated to the temperature shown in Table I.

TABLE I

| Ex. | $PbMO_2F$ Phases | PbO (grams) | $PbF_2$ (grams) | $M_2O_3$ (grams) | Temp. (°C.) |
|---|---|---|---|---|---|
| 1 | $PbGaO_2F$ | 1.1160 | 1.2260 | 0.9372<br>M = Ga | 700 |
| 2 | $PbScO_2F$ | 1.1160 | 1.2260 | 0.6896<br>M = Sc | 900 |
| 3 | $PbInO_2F$ | 1.1160 | 1.2260 | 1.3882<br>M = In | 900 |
| 4 | $PbLuO_2F$ | 1.1160 | 1.2260 | 1.9897<br>M = Lu | 800 |
| 5 | $PbYbO_2F$ | 1.1160 | 1.2260 | 1.9704<br>M = Yb | 800 |
| 6 | $PbTmO_2F$ | 1.1160 | 1.2260 | 1.9294<br>M = Tm | 800 |
| 7 | $PbErO_2F$ | 1.1160 | 1.2260 | 1.9126<br>M = Er | 800 |
| 8 | $PbTlO_2F$ | 1.1160 | 1.2260 | 2.2837<br>M = Tl | 550 |

For examples 1–7, the pressure and temperature were maintained for 1 hour. For Example 8 (M=Tl), the pressure and temperature were maintained for 30 minutes. The power to the furnace was then turned off. The capsules were rapidly quenched to room temperature and then the pressure was released. The capsule was cut open and the dense pellet formed was recovered.

A portion of the pellet was cut and ground to form a powder and X-ray powder diffraction measurements were performed. The X-ray diffraction patterns can be indexed on the basis of a cubic unit cell. The results for the $PbScO_2F$ oxyfluoride of Example 2 are typical and are shown in Table II. The lattice parameters for all the product oxyfluorides of Examples 1–8 are listed in Table III. The crystalline lead-containing oxyfluorides of this invention possess crystal structures that are closely related to that of the mineral perovskite.

TABLE II

| h k l | $d_{obs}$ (Å) | $d_{cal}$ (Å) |
|---|---|---|
| 1 0 0 | 4.140 | 4.136 |
| 1 1 0 | 2.925 | 2.928 |
| 1 1 1 | 2.3879 | 2.3879 |
| 2 0 0 | 2.0680 | 2.0680 |
| 2 1 0 | 1.8505 | 1.8497 |
| 2 1 1 | 1.6876 | 1.6885 |

TABLE III

| Example | $PbMO_2F$ Compound | Unit Cell parameter (Å) |
|---|---|---|
| 1 | $PbGaO_2F$ | 3.974 |
| 2 | $PbScO_2F$ | 4.136 |
| 3 | $PbInO_2F$ | 4.289 |
| 4 | $PbLuO_2F$ | 3.289 |
| 5 | $PbYbO_2F$ | 4.309 |
| 6 | $PbTmO_2F$ | 4.332 |
| 7 | $PbErO_2F$ | 4.341 |
| 8 | $PbTlO_2F$ | 4.395 |

Dielectric measurements were carried out as described above on a disk-shaped sample approximately 3 mm in diameter and approximately 1 mm thick cut from the dense pellet of $PbMO_2F$ produced in each Example. The measurements of the dielectric constant (K) and the loss factor (DF) at 300K and frequencies of $10^4$ Hz to $10^7$ Hz are given in Table IV. These data show that the dielectric constant is essentially independent of frequency.

TABLE IV

| Ex. No. | $PbMO_2F$ | $10^4$ Hz | | $10^5$ Hz | | $10^6$ Hz | | $10^7$ Hz | |
|---|---|---|---|---|---|---|---|---|---|
| | | K | DF | K | DF | K | DF | K | DF |
| 1 | $PbGaO_2F$ | 44.0 | 0.0006 | 44.0 | 0.0007 | 44.0 | 0.0009 | 44.1 | 0.0010 |
| 2 | $PbScO_2F$ | 28.8 | <0.0001 | 28.8 | 0.0001 | 28.8 | 0.0002 | 28.8 | 0.0007 |
| 3 | $PbInO_2F$ | 30.7 | 0.0008 | 30.7 | 0.0005 | 30.7 | 0.0007 | 30.7 | 0.0010 |
| 4 | $PbLuO_2F$ | 18.1 | 0.0005 | 18.1 | 0.0007 | 18.1 | 0.0006 | 18.2 | 0.0010 |
| 5 | $PbYbO_2F$ | 21.7 | 0.0008 | 21.7 | 0.0010 | 21.8 | 0.0010 | 21.7 | 0.0012 |
| 6 | $PbTmO_2F$ | 16.5 | 0.0007 | 16.5 | 0.0010 | 16.5 | 0.0008 | 16.5 | 0.0010 |
| 7 | $PbErO_2F$ | 15.2 | 0.0010 | 15.2 | 0.0014 | 15.2 | 0.0015 | 15.3 | 0.0016 |
| 8 | $PbTlO_2F$ | 37.7 | 0.0067 | 37.6 | 0.0054 | 37.9 | 0.0080 | 38.0 | 0.0140 |

Measurements of the dielectric constant (K) and the loss factor (DF) at a frequency of $10^6$ Hz and temperatures of 150K and 400K are given in Table V. These data show that the dielectric constant is essentially independent of temperature.

TABLE V

| Ex. No. | $PbMO_2F$ | 150 K | | 400 K | |
|---|---|---|---|---|---|
| | | K | DF | K | DF |
| 1 | $PbGaO_2F$ | 43.7 | 0.0001 | 44.4 | 0.0015 |
| 2 | $PbScO_2F$ | 28.5 | <0.0001 | 28.9 | 0.0003 |
| 3 | $PbInO_2F$ | 30.7 | 0.0003 | 31.2 | 0.0007 |
| 4 | $PbLuO_2F$ | 18.0 | 0.0005 | 18.2 | 0.0013 |
| 5 | $PbYbO_2F$ | 21.8 | 0.0007 | 21.7 | 0.0021 |
| 6 | $PbTmO_2F$ | 16.3 | 0.0005 | 16.9 | 0.0013 |
| 7 | $PbErO_2F$ | 15.1 | 0.0012 | 15.2 | 0.0035 |
| 8 | $PbTlO_2F$ | 36.3 | 0.0042 | 39.9 | 0.0132 |

What is claimed is:

1. A crystalline lead-containing oxyfluoride of the formula $PbMO_2F$, wherein M is selected from the group consisting of Ga, Sc, In, Lu, Yb, Tm, Er and Tl.

2. A process of making a crystalline lead-containing oxyfluoride of the formula $PbMO_2F$, wherein M is selected from the group consisting of Ga, Sc, In, Lu, Yb, Tm, Er and Tl comprising the steps of:

a) mixing stoichiometric amounts of precursor oxides and fluorides;

b) heating the mixture in a sealed container to a temperature of 550° C. to 900° C. and a pressure of $50 \times 10^8$ Pa to $70 \times 10^8$ Pa for 30 to 75 minutes;

c) quenching the container to room temperature; and d) recovering the oxyfluoride.

3. The process of claim 2, wherein the sealed container is made of gold.

4. The oxyfluoride of claim 1, wherein the oxyfluoride has a dielectric constant of at least 15 which varies less than about 10% between 150K and 400K.

5. The oxyfluoride of claim 4, wherein the dielectric constant varies by less than about 4% between 150K and 400K and wherein M is selected from the group consisting of Ga, Sc, In, Lu, Yb, Tm and Er.

* * * * *